United States Patent [19]
Haase

[11] 3,817,355
[45] June 18, 1974

[54] SINGLE-DRUM CONVEYOR BELT

[76] Inventor: Charles A. Haase, 246 S. Gladstone St., Aurora, Ill. 60506

[22] Filed: June 26, 1972

[21] Appl. No.: 266,204

[52] U.S. Cl. .............................. 186/1 A, 198/203
[51] Int. Cl. ............................................. A47f 9/02
[58] Field of Search......... 198/203, 208, 16, 16 MS, 198/184; 186/1 A

[56] References Cited
UNITED STATES PATENTS

| | | | |
|---|---|---|---|
| 1,494,655 | 5/1924 | Westerman | 198/184 |
| 2,243,538 | 5/1941 | Salfisberg | 198/203 |
| 2,776,730 | 1/1957 | Crabford | 186/1 A |
| 3,329,253 | 7/1967 | Tashman | 198/208 X |

FOREIGN PATENTS OR APPLICATIONS

| | | | |
|---|---|---|---|
| 429,582 | 7/1967 | Switzerland | 198/208 |
| 742,092 | 12/1955 | Great Britain | 198/208 |

Primary Examiner—Evon C. Blunk
Assistant Examiner—Douglas D. Watts
Attorney, Agent, or Firm—Edwin W. Uren

[57] ABSTRACT

A power-driven conveyor belt utilizes a single drum coupled to an electric motor for transporting articles from a loading station to a receiving station, frictional contact of the belt against the drum, such as is required for driving the belt, being provided by a stationary first resilient member disposed upstream of the drum and a second stationary resilient member disposed downstream of the drum and in transverse relationship with the periphery thereof, the two resilient members cooperating to hold the belt in frictional driven contact with the drum. A pair of guide members disposed upstream of the drum are utilized to define the precise direction of belt travel.

15 Claims, 4 Drawing Figures

PATENTED JUN 18 1974  3,817,355

3,817,355

SINGLE-DRUM CONVEYOR BELT

BACKGROUND OF THE INVENTION

Conventional article conveyor systems of the type commonly used at cashier or check-out stations in supermarkets generally comprise a wide belt stretched around a pair of cylindrical drums, the drums being mountably disposed within the skins or panels of the check-out counter such that the conveying side of the belt is flush with and communicates horizontally with the upper surface of the counter along which produce and purchased articles are moved. One of the cylindrical drums, usually the downstream drum, is driven by an electric motor in conjunction with a suitable speed reduction device, the other drum idlingly serving to provide the required belt tautness and to adjustably provide the necessary frictional contact of the belt against the driven drum. A rigid frame structure is generally provided for journaling the shafts and bearings upon which the drums rotate, such frame structure providing also a rigid surface disposed interiorly contiguous to the conveying portion of the belt for lending vertical support to the articles being conveyed. Essential to this conventional type conveyor belt system is adjustment means integrally associated with the frame structure and shafts for adjusting drum center distances, such adjustment means being characteristically resorted to frequently in the operation and maintenance of the belt conveyor system, an initial slackening adjustment being required when a new belt is assembled on the drums followed by a tightening and balancing adjustment to establish proper initial belt tension and balance, frequent tightening or slackening adjustments being thereafter required to compensate for belt stretching and shrinkage.

The conventional two-drum conveyor belt system is typically expensive to manufacture, not only by reason of the second drum requirement but also by reason of the rigid frame structure and relatively intricate adjustment means that are required. In addition, known conveyor belt systems are costly to maintain, particularly in view of the time and labor that is required for changing belts and for adjusting and maintaining proper belt tension and balance.

SUMMARY OF THE INVENTION

It is accordingly an object of the present invention to provide an improved conveyor belt system that is economical to build, such economy arising from its simplistic design and the minimal number of parts required, the second drum being rendered superfluous and the frame structure greatly simplified.

It is a further object of the present invention to provide an improved conveyor belt system that is more economical to maintain, such economy arising from a significant reduction in the time and labor that is required for belt installation and for maintaining proper belt tension and balance.

It is still a further object of the present invention to provide an improved conveyor belt system that is highly reliable in performance and assures optimized trouble-free service and maximized through-put at the check-out counter, maximized through-put being realized by the elimination of down-time for adjustably compensating for belt shrinkage and stretching.

An important aspect of the invention is the use of a single driven cylindrical drum for frictionally driving a conveyor belt which is movably disposed between a loading station and a receiving or packaging station in a check-out counter, continual and effective frictional driving contact of the belt against the drums being provided by a first resilient member supportably disposed upstream of the drum and a second resilient member disposed downstream of the drum, the first member pinchably cooperating with a fixed arcuate tension member disposed interiorly of the belt and the second member transversely and pinchably cooperating with the periphery of the drum at a predetermined point substantially opposite the drum from the receiving station.

Another important aspect of the invention is the use of an article supporting structure disposed interiorly contiguous to the conveying portion of the belt, such structure at its upstream extremity providing fixed support for the arcuate tension member pinchably cooperating with the first resilient member.

Still another important aspect of the invention is the use of a pair of belt-separated upright guide members disposed upstream of the drum and proximate the lateral extremities of the loading station, such guide members being effective for maintaining the belt in proper lateral registry with the arcuate tension member and with the article supporting structure, thereby precisely defining the direction of travel of the belt as between the loading station and the receiving station.

BRIEF DESCRIPTION OF THE DRAWING

These and other objects, aspects and advantages of the invention will be more clearly understood from the following description when read in conjunction with the accompanying drawing, in which:

FIG. 1 is a perspective view of the improved conveyor belt system in the environment of one type of check-out counter such as are commonly used in supermarkets and the like;

DETAILED DESCRIPTION OF A PREFERRED EMBODIMENT

Figure 1:
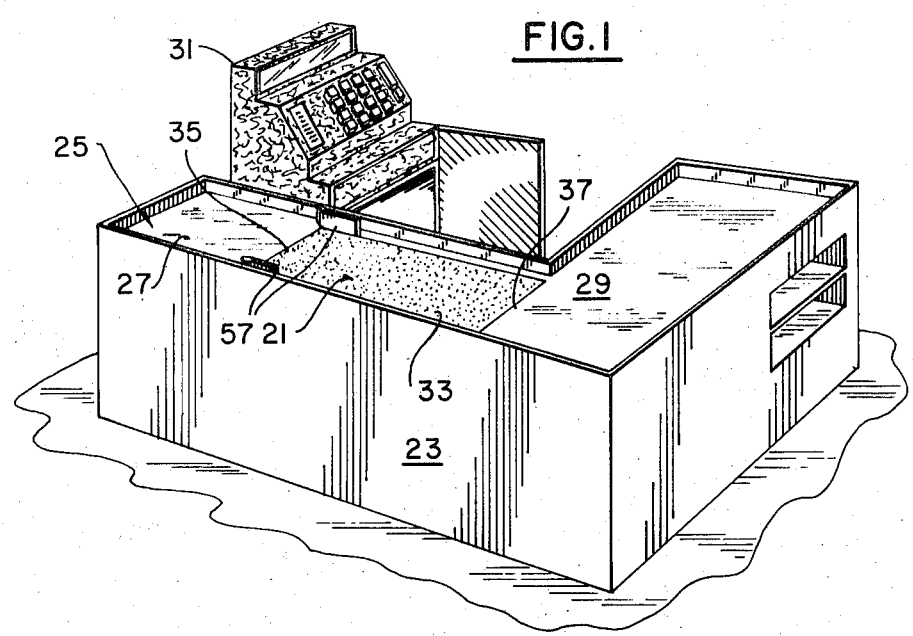

The preferred embodiment of the invention, as generally designated at 21 in FIG. 1, may be utilized in the environment of a check-out counter commonly used in supermarkets and the like, one such check-out counter comprising exterior skins or panels 23 and an L-shaped upper counter surface 25 consisting of a loading station 27 and a packaging or receiving station 29, the check-out counter being utilized for tabulating the prices of purchased articles as by a cash register 31. An endless belt 33 forming a part of the invention would be disposed intermediate the loading station 27 and the receiving station 29 for conveying articles therebetween commensurate with the performance of the tabulating function.

The belt 33, and the embodiment of the present invention, would be so oriented relative to the check-out counter that the conveying portion of the belt would travel from the loading station 27 to the receiving station 29, the belt enterably forming the upper surface of the counter between an entrance aperture 35 and an exit aperture 37. When utilized in connection with the check-out counter of FIG. 1, the hereinafter described elements of the preferred embodiment of the invention would be supported by any suitable attachment means associated with the frame work of the counter, such attachment means not forming a part of the present invention.

Figure 2:
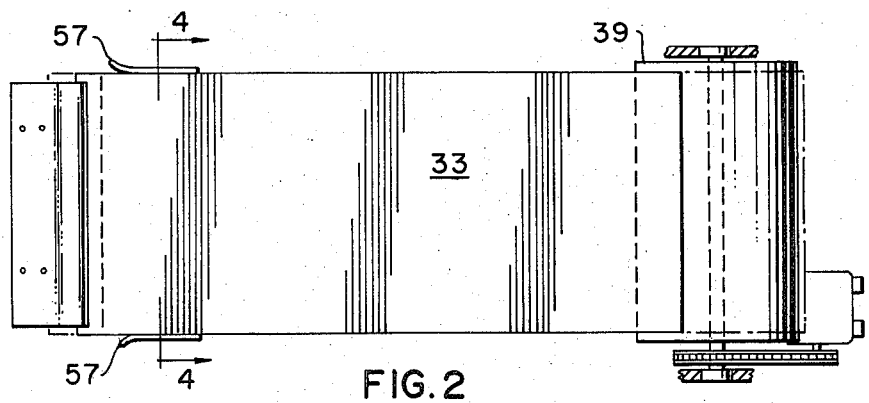
FIG. 2 is a plan view of the improved conveyor belt system showing various of its elements.
Figure 3:
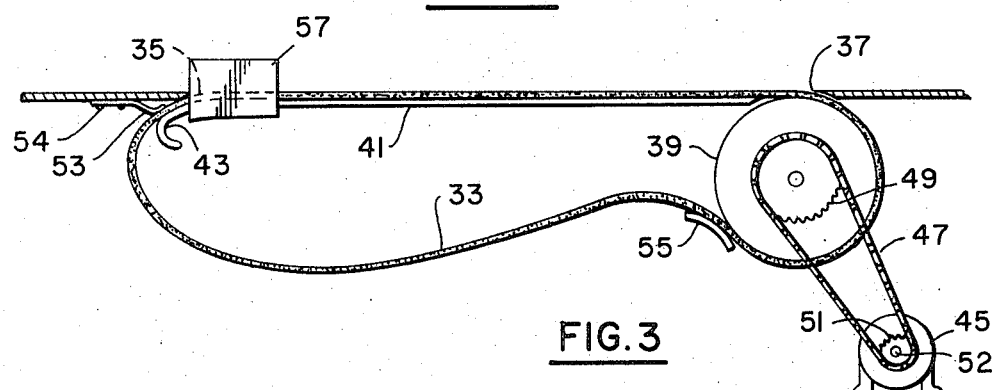
FIG. 3 is a side elevation of the improved single drum conveyor showing the drum in association with the endless belt and the various elements of the friction-setting and belt-directing means.

The preferred embodiment of the invention will now be described with reference to FIGS. 2 and 3 wherein the endless belt 33 is shown in encompassing relationship relative to a driven cylindrical drum 39 and an article supporting structure 41. The article supporting structure 41 might be rigidly attached to the side frames of the check-out counter in communicating relationship relative to the entrance aperture 35 and the exit aperture 37. Forming an integral part of the article supporting structure 14 at the end thereof adjacent the entrance aperture 35 is an arcuate tension member 43, such arcuate member 43 serving to support and to guide the endless belt as it enters the entrance aperture 35. The cylindrical drum 39 is driven in a clockwise direction (as viewed in FIG. 3) by means of an electric motor 45 and a chain belt 47, the chain belt 47 drivingly cooperating with a sprocket wheel 49 integrally associated with the drum and a smaller sprocket wheel 51 fixed to the motor shaft 52.

A first resilient member 53 is fixed to the underside of the upper surface of the loading station 27, as by screws 54, such that an arcuate portion thereof applies a predetermined constraining force against the belt 33 as it rides over the arcuate tension member 43, the belt being thereby pinched with predetermined frictional force between the members 43 and 53 immediately preceding its movement through the entrance aperture 35. A second resilient member 55 is attached to the frame work of the check-out counter by any suitable means such that the belt 33 is held in frictional contact with at least 180° of the periphery of the drum, as measured clockwise from the exit aperture 37 (FIG. 3). The peripheral surface of the drum is wrapped or coated with any suitable material having a high coefficient of friction, such as urethane. The predetermined constraining force applied to the belt by the first resilient member 53 and the arcuate tension member 43 co-operating therewith should be minimially sufficient to assure an effective drag load on the conveyor portion of the belt when such portion is free of conveyed articles, it being understood that the weight of articles being conveyed will tend to increase belt tension and to thereby increase the frictional force between the belt and the drum.

Figure 4:
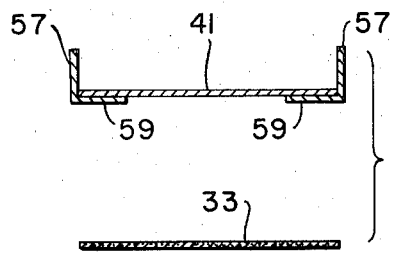
FIG. 4 is a view taken along the line 4—4 of FIG. 2 and showing the inter-relationship of the pair of upright guide members effective for defining the path of travel of the endless belt.

A pair of upright guide members 57 disposed upstream of the drum and proximate the entrance aperture 35 serve to control the linear movement of the belt as it moves from the loading station to the receiving station, thereby defining and precisely controlling the direction of belt travel. These upright guide members 57 may be fixed to the article supporting structure 41 in any suitable manner, such as by formed tongues 59 (FIG. 4) pinned to the underside of the supporting structure 41.

Operation

To convey produce and purchased articles from the loading station 27 to the packaging or receiving station 29, the articles may simply be slid from the loading station 27 past the entrance aperture 35, or placed directly on the belt 33, the articles being thereupon conveyed to the packaging station 29 by means of the moving belt 33. It is apparent that the preferred embodiment of the invention may be used in multiples in connection with various sized and configured check-out counters, such as in occupancy of at least a portion of the loading and packaging stations 27 and 29, respectively, in which case corresponding foot controls may be utilized for starting and stopping the individual conveyor belts. For each installation of the inventive single-drum conveyor belt system, a corresponding motor 45 would be turned on to rotate a corresponding chain belt 47, the corresponding sprocket wheel 49 and drum 39 being thereby rotated in the proper belt driving direction, each moving belt being retained in frictional contact with at least 180° of the periphery of its associated drum by its associated first resilient member 53 constrainably cooperating with its associated arcuate tension member 43 and the frictional contact of its second resilient member 55 against the periphery of its associated drum, the upright guide members 57 associated with each belt serving to maintain the respective belt in accurate registration with its associated article supporting structure.

What is claimed is:

1. In a conveyor system for transporting articles along a processing station, an improved conveyor belt drive device comprising:
   a. an endless belt disposed in linearly contiguous and encompassing relationship to an article supporting structure and defining a predetermined path of travel within said conveyor system, said article supporting structure forming a part of said conveyor system and spanning the linear distance defining said processing station, said processing station being further defined by an upstream entrance aperture through which the endless belt enters and a downstream exit aperture through which said belt exits,
   b. a single driven drum for frictionally driving said belt in the direction of article transport,
   c. a first and second resilient member for frictionally holding said belt in a tensioned state for a predetermined limited portion of its said path of travel in said conveyor system, and in frictional contact with said drum for a predetermined angular periphery thereof such that said belt is driven by said drum irrespective of the presence or absence of articles on a conveying portion of said belt corresponding to said article supporting structure and to said processing station, said first resilient member being disposed upstream of said drum in contiguous relationship relative to said upstream entrance aperture and said second resilient member being disposed along the opposite side of said drum from said downstream exit aperture, and
   d. at least a pair of guide members disposed upstream of said drum for controllably guiding said belt along a predetermined path corresponding to said direction of article transport.

2. The improved conveyor belt drive device defined in claim 1 wherein said drum is rotatably driven by an electric motor.

3. The improved conveyor belt drive device defined in claim 1 wherein the surface of said drum is coated with a material having a high coefficient of friction.

4. The improved conveyor belt drive device defined in claim 3 wherein said coating on said drum is composed of urethane.

5. The improved conveyor belt drive device defined in claim 1 wherein an arcuate tension member is integrally connected to said article supporting structure and disposed in supportable cooperating relationship with said first resilient member.

6. The improved conveyor belt drive device defined in claim 1 wherein said predetermined angular periphery of said drum against which said belt is held by said second resilient member is at least 180° as defined by said second resilient member and said exit aperture.

7. The improved conveyor belt drive device defined in claim 1 wherein said pair of guide members disposed upstream of said drum are located on opposite sides of said endless belt proximate said entrance aperture.

8. The improved conveyor belt drive device defined in claim 1 wherein said first and said second resilient members in cooperation with said drum are effective to hold said belt in a tensioned state throughout said predetermined limited portion of its said path of travel within said conveyor system, and throughout said processing station defined by said upstream entrance aperture and said downstream exit aperture, and wherein that portion of said belt traveling between said second resilient member and said first resilient member is provided with gravitational slack, said slack resulting from the length of the belt which is slightly in excess of what would be required to snugly encircle said drum and said article supporting structure.

9. In a conveyor system for transporting articles from one station to another as from a loading station to a receiving station, an improved conveyor belt drive device comprising:
   a. an endless belt disposed in encompassing relationship to an article supporting structure and defining a predetermined path of travel within said conveyor system, said article supporting structure and said belt defining the latitudinal and longitudinal dimensions of a conveying portion of said belt of which the longitudinal dimension is further characterized by the presence of an upstream aperture in said conveyor system through which said belt enters and a downstream aperture through which said belt exits,
   b. a single driven drum supportably disposed within said endless belt and in contiguous relationship to said downstream aperture for frictionally driving said belt in the direction of article transport,
   c. friction setting means associated with said article supporting structure and effective for holding said belt in a tensioned state for a predetermined limited portion of its said path of travel and for constrainably holding said belt in frictional driving contact with a predetermined angular periphery of said drum, said friction setting means including a first resilient member frictionally cooperating with the outer surface of said belt and disposed upstream of said drum in contiguous relationship to said entrance aperture, an arcuate tension member guidably cooperating with the inner surface of said belt and constrainably cooperating with said belt and said first resilient member, said tension member being integrally formed at the upstream extremity of said article supporting structure, and a second resilient member constrainably cooperating with the outer surface of said belt and disposed in contiguous relationship with the periphery of said drum, and
   d. belt directing means associated with said article supporting structure and effective for controllably guiding said belt in the direction of article transport.

10. The improved conveyor belt drive device defined in claim 1 wherein said drum is rotatably driven by an electric motor.

11. The improved conveyor belt drive device defined in claim 1 wherein the surface of said drum is coated with a mterial having a high coefficient of friction.

12. The improved conveyor belt drive device defined in claim 11 wherein said coating on said drum is composed of urethane.

13. The improved conveyor belt drive device defined in claim 1 wherein said second resilient member applies sufficient frictional force of said belt against said drum for said predetermined angular periphery thereof such that the rotation of said drum is effective to drive said belt when articles are being carried by the conveying portion thereof, and wherein said first resilient member in cooperation with said arcuate tension member serve to apply sufficient frictional force of said belt against said drum such that the rotation of said drum is effective to drive said belt when said conveying portion of said belt is free of all such articles.

14. The improved conveyor belt drive device defined in claim 13 wherein said belt directing means comprises:
   a pair of upright guide members disposed upstream of said drum and in straddling relationship relative to the width of said belt proximate said entrance aperture, said guide members being supported by said article supporting structure adjacent said arcuate tension member and extending upwardly on either side of said belt to thereby provide directional guidance thereto.

15. The improved conveyor belt drive device defined in claim 1 wherein said predetermined angular periphery of said drum against which said belt is held by said friction setting means is at least 180° as defined by said exit aperture and said second resilient member.

* * * * *

UNITED STATES PATENT OFFICE
CERTIFICATE OF CORRECTION

Patent No. 3,817,355    Dated June 18, 1974

Inventor(s) Charles A. Haase

It is certified that error appears in the above-identified patent and that said Letters Patent are hereby corrected as shown below:

Col. 6, line 23, "1" should be --9--,
      line 26, "1" should be --9--,
      line 32, "1" should be --9--,
      line 55, "1" should be --9--.

Signed and sealed this 24th day of September 1974.

(SEAL)
Attest:

McCOY M. GIBSON JR.
Attesting Officer

C. MARSHALL DANN
Commissioner of Patents